United States Patent [19]

Jackson

[11] Patent Number: 4,931,782
[45] Date of Patent: Jun. 5, 1990

[54] TOUCH SCREEN OVERLAY WITH IMPROVED CONDUCTOR DURABILITY

[75] Inventor: Scott C. Jackson, Kennett Square, Pa.

[73] Assignee: E. I. Du Pont de Nemours and Company, Wilmington, Del.

[21] Appl. No.: 210,961

[22] Filed: Jun. 24, 1988

[51] Int. Cl.$^5$ .................... G08C 21/00; G09G 3/02
[52] U.S. Cl. ...................................... 340/706; 178/18
[58] Field of Search ............... 340/706; 178/18, 19

[56] References Cited

U.S. PATENT DOCUMENTS

| | | | |
|---|---|---|---|
| 4,423,299 | 12/1983 | Gurol et al. | 340/159 |
| 4,567,480 | 1/1986 | Blanchard | 340/365 |
| 4,571,454 | 2/1986 | Tamaru et al. | 178/18 |
| 4,686,332 | 8/1987 | Greanias et al. | 178/19 |
| 4,696,860 | 9/1987 | Epperson | 428/325 |

*Primary Examiner*—Stafford D. Schreyer

[57] ABSTRACT

A touch screen overlay for use on the viewing surface of a visual display device formed from a flexible membrane laminate having improved conductor durability. The flexible laminate comprises first and second flexible substrates formed of transparent polyester material. An array of parallel transparent conductors is deposited on a surface of each flexible substrate. The two flexible substrates are joined together by an adhesive sheet of polyester material. The substrates are joined so that transparent conductors are deposited on the surface of each flexible substrate which faces away from the viewing surface when the overlay is attached to the visual display device. The two arrays, when so superimposed, form a grid-like pattern, separated by the thickness of the upper one of the flexible substrates and the adhesive sheet. A third flexible substrate also formed of polyester material covers the surface of the upper one of the other flexible substrates carrying the upper array of parallel conductors. The second and third flexible substrates are also joined by an adhesive sheet of polyester material. When the overlay is contacted either by finger touch or by a stylus, the transparent conductors located in the laminated below the contact area will subjected substantially only to compression forces.

14 Claims, 4 Drawing Sheets

TOUCH SCREEN OVERLAY WITH IMPROVED CONDUCTOR DURABILITY

BACKGROUND OF THE INVENTION

1. Field of the Invention

This invention relates generally to touch screen overlays for use on the viewing surface of visual display devices such as computer monitors and, more specifically, this invention relates to a laminate structure for such overlays with greatly improved durability and signal strength.

2. Description of the Prior Art

Touch screen overlays have been used as interactive input devices at the display surface of computer monitors such as cathode ray tubes, gas panel displays, light-emitting diode arrays and other such types of visual display devices. Such overlays have obvious advantages over conventional data input devices such as keyboards by enabling the user to interface more directly with the computer by interreacting directly with the monitor display. Such interaction may be by finger touch or by use of a stylus. The latter is preferable since it enables the user to input data in various forms, including handwritten alphanumeric text and graphics.

One of the first interactive display devices utilized the light pen which has a photodetector near its tip. The light pen is manipulated by placing its tip in proximate contact with a computer monitor screen at a desired location. As the raster scans the face of the monitor, the light dot it produces is detected by the light pen, thus enabling the computer to correlate the position of the pen with coordinates of the raster. This type of interactive display device is not truly a touch sensitive one since it relies essentially on photodetection rather than touch. Light beam arrays interrupted by the presence of a finger or other intrusive object likewise rely principally upon photodetection rather than touch.

One form of touch sensitive display uses a flexible, deformable membrane formed of a transparent laminate which is placed over the display surface of the computer monitor. The laminate generally comprises two conductor planes deposited on a flexible medium so that when the user mechanically displaces one of the conductor planes by a finger or stylus, the conductors are brought into electrical contact with the conductors in the second plane. The electrical resistance of the conductor plane is changed as a function of the position of the touch on the membrane. Appropriate electronics are provided to translate the resistance value into the position corresponding with the touch.

One version of such touch screen membranes is manufactured by the John Fluke Mfg. Co., Inc. and is typified in a number of patents assigned to this company, including U.S. Pat. No. 4,423,299 (Gurol et al) and U.S. Pat. No. 4,696,860 (D. L. Epperson). The touch screen display disclosed in the '299 patent uses a flexible membrane to support a first set of parallel transparent conductors. These conductors face a second set of parallel transparent conductors mounted on a backplate which is secured to the surface of the computer monitor. The second set of conductors faces upward away from the monitor while the first set faces downward toward the monitor. The conductors of one set run horizontally while those of the other set run vertically so when superimposed they form a grid. The different layers are closely spaced apart and held together on the outer periphery by, for example, spring clips. Between the two sets of a conductors is an air gap. Along the outside edge of each layer is a bus which interconnects the conductors supported on that layer. In this manner, electrical signals from the conductors are transmitted to appropriate electronic equipment. When pressure from a finger or stylus is applied to the flexible membrane, the first set of conductors will be deflected downward across the air gap into contact with the second set of conductors mounted on the backplate along the surface of the monitor. Contact between these sets of conductors acts as a mechanical closure of a switch to complete an electrical circuit which is detected by the electronic equipment through the respective buses at the edge of the panel, thus providing a means for detecting the location of the switch closure. To prevent inadvertent contact between the sets of conductors, both the '299 and '860 patents disclose uniformly distributing transparent beads or bumps of non-conductive material to keep the sets of conductors apart in the air gap except when pressed by the operator.

In the mechanically deformable type of membrane described in the aforenoted patents, the first set of conductors in the top membrane layer must flex or bend in order to make physical contact with the the second set of conductors below. The degree of such bending is reduced in a another type of membrane touch screen such as described in U.S. Pat. No. 4,686,332 (Greanias et al), which is assigned to the IBM Corporation. The structure of the touch screen described in this patent is fairly similar to that of the mechanically deformable screens described above, except that the air gap has been replaced with a very thin non-conductive adhesive layer. There is therefor no mechanical switch action such as described above. Rather, the conductors radiate electromagnetic signals out from the surface of the screen. These signals can be detected by a radiative pickup stylus. The presence of a finger can be detected by a change in the capacitance of the conductor array while the location of the stylus is determined by the signal strength of the electro-magnetic radiation emitted by individual ones of the conductors.

The structure of the overlay membrane disclosed in the '332 patent can be better understood with reference to FIGS. 8 and 12 of that patent. The air gap has been replaced by the non-conductive adhesive serving as an insulation layer 52. The overlay 20 in FIG. 12 comprises two major portions, an inner laminate 56 and an outer laminate 58 which are attached by an adhesive layer 52'. The inner laminate is applied over the outer surface of the glass face of a computer monitor. The inner laminate also has an anti-newton ring coating 53 which is applied to the display side of the overlay to eliminate newton rings when the inner laminate comes into contact with the glass face of the monitor and an electrostatic shield layer of transparent conductive material which is grounded and serves to shield the conductors of the overlay from noise generated by the monitor. The inner laminate also contains inner substrate layer 50 which is an optically clear layer of polyethylene terephthalate onto which is sputtered transparent wire coatings of indium tin oxide arranged as parallel vertical conductors facing out from the monitor display. The outer substrate layer 54 of the outer laminate 58 is substantially the same as the inner substrate 50. Indium tin oxide conductors are likewise deposited on the outer substrate layer 54, but facing inward toward the monitor display and oriented at right angles to the vertical conductors deposited on the inner substrate 50. The inner and outer substrates are disposed so that the respective sets of conductors formed thereon face each other. Both the inner and outer substrates are coated on the face containing the conductors with a thin insulation layer of ultraviolet initiated vinyl acrylic polymer, 52 and 52", respectively, and both are joined with adhesive layer 52' of the same composition as the insulation layers. When the inner and outer laminates are joined, layers 52, 52', and 52" become indistinguishable and can be regarded structurally as a single thin insulating layer between the facing sets of transparent conductors.

Touch screen overlays such as disclosed in the foregoing prior art patents are deficient in several important respects. One is the durability of the laminate, particularly the transparent conductors. Indium-tin-oxide (ITO) is typically used for the conductor wires because of its transparent and conductive properties. This compound is a ceramic material belonging to a class of the materials known as transparent conducting oxides. Being ceramic, these materials are quite brittle and can readily crack under tensile forces. Cracking of conductor wires in touch screens is very serious since electrical conductivity and therefor signal transmission will be lost. In the touch screen overlays of the above described prior art, the transparent wire conductors formed on the outer membrane substrate and facing down toward the monitor screen undergo significant tensile forces when a stylus or other hard instrument is forced against the touch screen. This is particularly severe in the prior art touch screens which have an air gap between the two sets of conductors since a large deflection of the top flexible membrane creates large tensile forces in the transparent conductors formed on the inside surface of the membrane. The stylus forces the top flexible membrane downward so that contact is made between the upper and lower conductors. This creates large tensile forces on the inner surface of the upper membrane which carry the first set of wire conductors. These tensile forces can cause the conductor wires to crack and lose their ability to conduct electricity. The touch screen will therefore fail in any area where such cracking has occurred.

Cracking of the conductors due to such tensile forces is also a serious problem in touch screens such as disclosed in the aforenoted U.S. Pat. No. 4,686,332 where the air gap is replaced with the adhesive layer. While this relatively hard, thin layer makes the touch screen more durable, experimental tests with a moving stylus has shown that cracking of the upper ITO conductors still occurs. In fact, a stylus readily cracks the transparent ITO conductors with only hand pressure. The tensile forces are so great at the centerline of the stylus that elongation of the ITO conductors is sufficient to cause considerable cracking problems and, therefor, failure of the touch screen.

While increasing the thickness of the outer substrate layer 54 in the touch screen overlay of the '332 patent would improve conductor durability somewhat, this additional thickness would weaken conductor signal strength significantly. The additional thickness would so attenuate the electromagnetic signals emitted by the the transparent conductors that a change in capacitance due to finger touch could no longer be detected effectively. The strength of the signal received by the stylus would also be weakened significantly.

Moreover, irrespective of the thickness of the upper subtrate, there are significant signal losses in the touch screen overlay of the '332 patent due to the screening of the signal from the lower conductors by the upper conductors. This is due to the close proximity of the two sets of conductors in this prior art overlay, with the two sets of conductors facing one another and separated only by the adhesive layer. The electromagnetic signals emanating from the lower conductors are therefor intercepted and absorbed by the upper conductors, thereby greatly attenuating the signal strength available for detection at the surface of the touch screen overlay.

Another disadvantage of the laminate touch screen disclosed in the aforenoted U.S. Pat. No. 4,686,332 is due to deficiencies of the adhesive layer 52, which is a thin layer of ultraviolet light initiated vinyl acrylic polymer. This adhesive layer has been found to have poor peel strength, due in part to the incompatibility of this adhesive with the base film supporting the transparent wires. The peel strength is also poor due to the inadequate cure of this adhesive because the ultraviolet light needed to cure or initiate the acrylic polymer is readily adsorbed in the other substrates supporting the ITO conductors. Another deficiency is that the adhesive layer, while transparent to light, does not readily lend itself to producing a flat, distortion free touch screen overlay.

SUMMARY OF THE INVENTION

The present invention greatly improves the durability of touch screen overlays by providing a laminate structure which eliminates cracking of the transparent conductors when the overlay is subjected to the rubbing pressures exerted by a stylus. The laminate structure of the present invention is also more durable long term since fatigue stress is reduced. Moreover, improved durability of the touch screen overlay is achieved without adversely affecting the signal strength of the lower set of transparent wire conductors. In fact, the lower conductor signal strength at the surface of the overlay is greatly improved.

The improved durability is achieved by reversing the dominate forces on the transparent conductors deposited on the top layer of the membrane laminate. In the prior art, these conductors were subjected to tension which leads to cracking. In the laminate structure of the present invention. These conductors are subjected principally to compression forces when a stylus rubs along the top of the touch screen overlay. Transparent conducting oxides of ceramic material such as ITO are quite brittle and readily crack under tension exerted by tensile forces. These materials, however, can withstand a significant amount of compressive forces.

The present invention makes use of this phenomenon by modifying the laminate structure so that both the upper and lower set of transparent conductors are subjected principally to compression when a stylus is used. This is achieved in a preferred embodiment of the present invention by reversing the orientation of the upper set of conductors so that they face upward away from the monitor screen as do the lower set of conductors. The present invention also thereby improves the signal strength of the lower conductors at the overlay surface by reducing the screening of the lower conductors by the upper conductors since the two sets of conductors are now further spaced apart in the new laminate structure.

BRIEF DESCRIPTION OF THE DRAWINGS

The present invention may be more fully understood from the following detailed description thereof taken in connection with the accompanying drawings, which form a part of this application and in which.

DETAILED DESCRIPTION OF THE INVENTION

Figure 1:
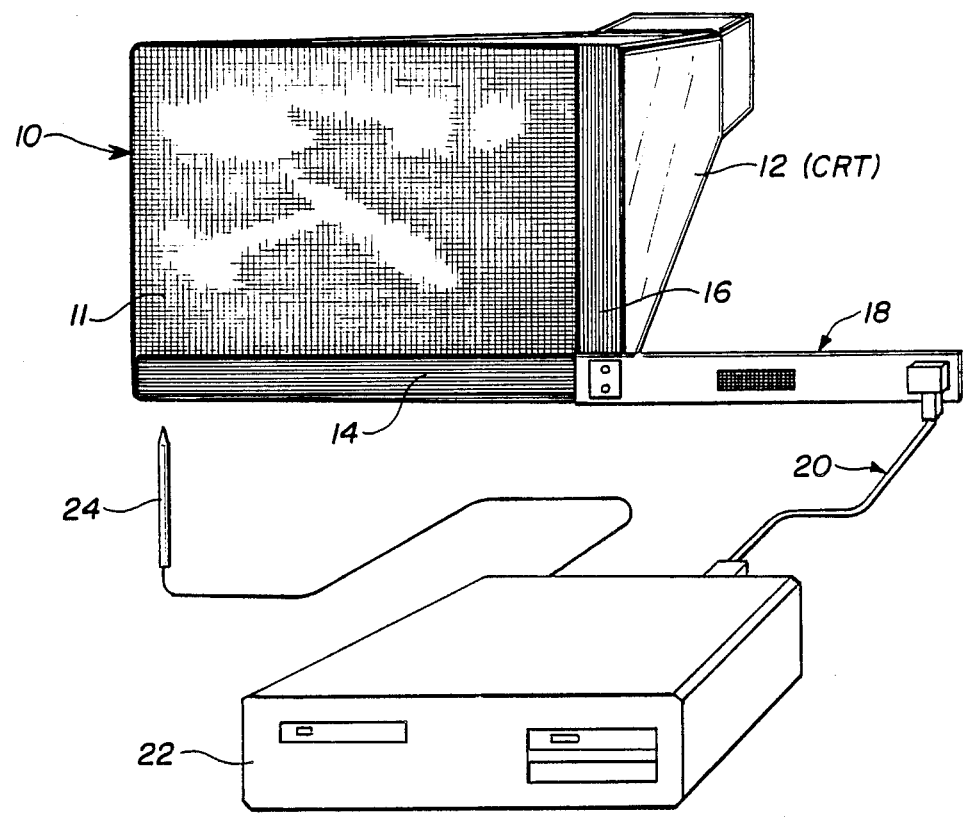
FIG. 1 is a schematic illustrating the touch screen overlay of the present invention in its intended environment at a computer workstation.

The touch screen overlay of the present invention is designed for use with a personal computer or other type of computer terminal or workstation where an interactive input device which permits either finger touch or stylus detection input would be useful. Such a computer workstation is shown schematically in FIG. 1 which includes a computer monitor such as a cathode ray tube (CRT) 12 and a control processor 22 which operates on stored program instructions and contains the electronics to provide detection of either finger touch location or stylus location or both.

The touch screen overlay 10 is attached by suitable means to the display screen of the CRT 12. A plurality of transparent conductors disposed vertically and horizontally in different layers of the overlay form a grid pattern of conductors shown generally by reference number 11 in the overlay 10. The vertical conductors are connected to a horizontal bus 14 located in the non-viewing area of CRT 12 along a side of the overlay layer carrying the vertical conductors. Likewise, the horizontal conductors are connected to a vertical bus 16 located in the non-viewing area of the CRT along a side of the overlay layer carrying the horizontal conductors. Electrical signals from the transparent conductors of the overlay are transmitted via these buses to a flexible circuit 18 which is connected to the control processor 22 via a cable and connectors shown generally as 20.

A stylus 24 capable of detecting electromagnetic radiation generated by the transparent conductors of the overlay 10 is also connected to the control processor 22. The stored program instructions and electronics of the control processor is able to correlate the signals from the stylus 24 and from the conductor grid to determine the horizontal and vertical position of the stylus anywhere along the viewing surface of the CRT and thereby display the movement of the stylus point on the CRT screen. Electronics in the control processor 22 is also able to detect the position of a finger touch through the change in capacitance between conductors at the corresponding location on the overlay 10.

Figure 2:
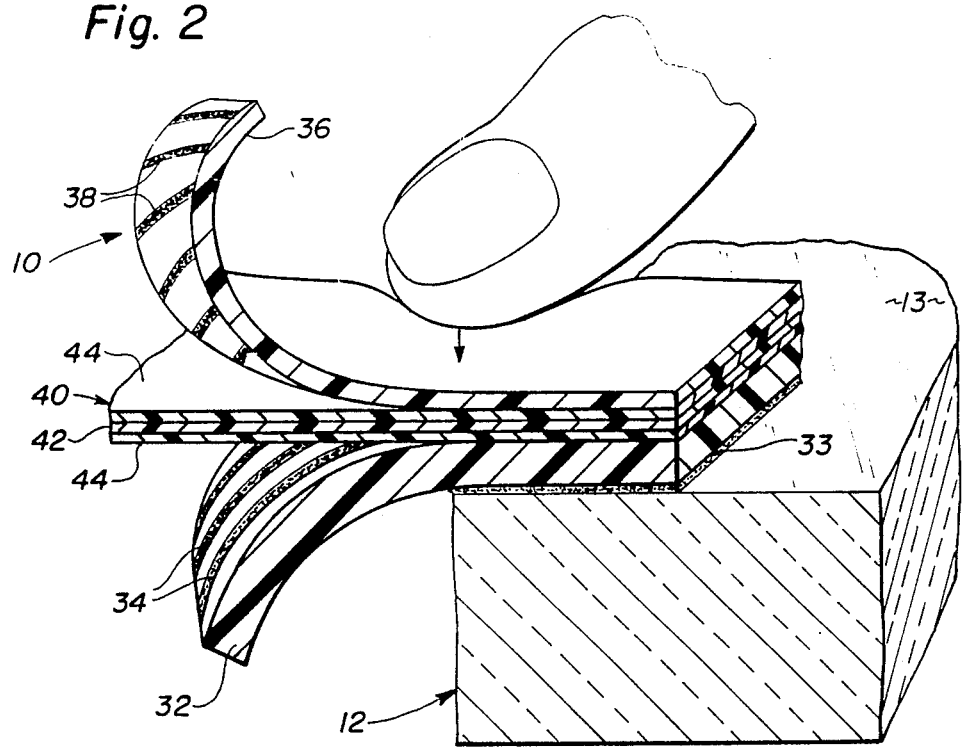
FIG. 2 illustrates a touch screen overlay having an improved bondply adhesive for laminating layers of the overlay together.

FIG. 2 illustrates a touch screen overlay 10 which may be used with the system of FIG. 1. The overlay 10 is similar to that described in the aforenoted U.S. Pat. No. 4,686,332, except that the vinyl acrylic layer of the prior art overlay has been replaced by a sheet adhesive or bondply. The overlay 10 comprises a lower substrate 32 formed from a sheet of polyester material such as polyethylene terephthalate, which is transparent and electrically insulative. The lower substrate 32 is fairly thin, on the order of about 5 mil or about 0.005 inches. The lower substrate may be directly attached to the glass display surface 13 of the CRT 12 by, for example, a thin layer of transparent adhesive 33 having a thickness of about 1 mil. An anti-newton ring coating and an electrostatic shield layer may also be included between the face of the CRT 12 and the lower substrate 32. On the upper surface (the side facing away from the CRT) of the lower substrate 32 is deposited either a horizontal or vertical array of transparent conductors 34. These conductors are typically deposited by magnetron sputtering a transparent conducting material, usually a ceramic material such as indium-tin-oxide (ITO). The thickness of each transparent conductor 34 is approximately 1000 angstroms. The ITO conductors are etched to provide approximately 25 mils wide line and are spaced approximately 125 mils center to center.

The overlay 10 also comprises an upper substrate 36 formed of the same polyester material as the lower substrate 32. The upper substrate is somewhat thinner than the lower substrate, approximately on the order of 2 mils. On the lower surface of the upper substrate (the side facing toward the CRT) is deposited an array of transparent conductors 38 similar to those deposited in the lower substrate, except that orientation of the array (horizontal or vertical) is opposite that of the lower substrate in order to present the grid-like structure referred to earlier. The upper surface of the upper substrate 36 faces the viewer and is contacted by the finger (as shown in FIG. 2) or by a stylus. This surface may be overcoated by an antiglare coat.

The upper and lower substrates 36,32 are joined together in a laminate by a sheet adhesive or bondply 40. The latter is a three-layer sandwich formed of a transparent polyester base film 42 of about 0.5 mils thick coated on both sides with a transparent polyester based adhesive 44, each coating 44 being approximately also 0.5 mils thick. Both the polyester base film 42 and the polyester-based adhesive coatings 44 are compatible with one another and can be cured by means other than ultraviolet light, a major disadvantage encountered with the vinyl acrylic adhesive used in the overlay of the aforenoted U.S. Pat. No. 4,686,332. The polyester adhesive coating 44 is a heat setting adhesive. Moreover, the polyester based adhesives 44 of bondply 40 are compatible with the polyester material of the upper and lower substrates 36,32 supporting the transparent conductor arrays. These adhesives can therefor be readily cured at elevated temperatures and applied pressure. The peel strength of the polyester-based adhesives 44 is superior to the vinyl acrylic material used in the above described prior art overlay, and the process for curing provides a transparent, flat and distortion-free touch screen display which has optical properties superior to the overlay disclosed in the aforenoted U.S. Pat. No. 4,686,332.

An additional advantage of the bondply 40 is that each of its layers, including the polyester-based adhesive layers 44, come in sheet form. This permits far easier processing and more controlled thickness of the overall overlay laminate as compared with the earlier laminate wherein the vinyl acrylic adhesive must be applied in paste form.

The improved laminate structure of the touch screen overlay 10 of FIG. 2 still suffers from the conductor durability problem discussed earlier in connection with the prior art touch screens. The transparent wire conductors 38 disposed on the lower surface of the upper substrate 36 are subjected to tensile forces created by the pressure exerted by a moving stylus on the top or writing surface of the upper substrate 36. Since these conductors are formed of a brittle ceramic material such as ITO, they readily crack under tension, thereby interrupting electrical conductivity and signal transmission in the overlay.

Figure 3:
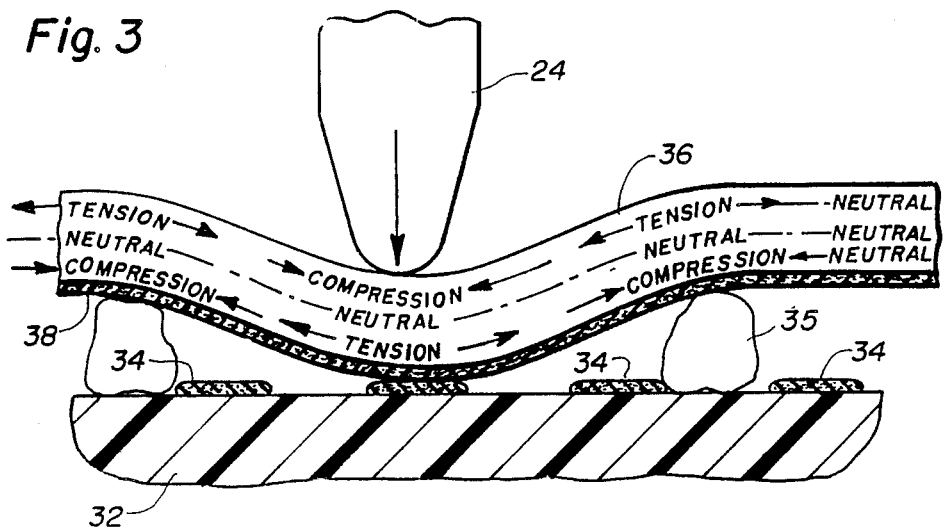
FIG. 3 is a diagrammatic illustration of the tension and compression forces exerted on a upper substrate of a prior art overlay.

FIG. 3 diagrammatically illustrates the forces exerted on the upper substrate of the overlay laminate with an air gap between the two sets of conductor arrays. Transparent beads or bumps 35 maintain the air gap and separation between the two sets of conductors. The stylus 24 forces the top substrate 36 downward until contact is made between the upper transparent conductors 38 and the lower conductors 34 of the lower substrate 32. This downward deflection exerts both compressive and tensile forces on the upper substrate 36. As seen in FIG. 3, the upper substrate 36 is in compression at or near the top surface and in tension at or near its lower surface. These forces tend to cancel one another toward the middle of the substrate's thickness. Since the bottom surface (facing the CRT) of the upper substrate is where the prior art overlays deposited the upper set of transparent conductors and since this surface is subjected to the largest tensile forces exerted on the upper substrate when contacted by stylus, the upper ITO conductors were very prone to cracking.

As noted earlier, cracking of ITO conductors due to tensile forces at the lower surface of the upper substrate is also a serious problem for the touch screen overlays not using an air gap for mechanical switch closure, such as the touch screen overlay disclosed in the aforenoted U.S. Pat. No. 4,686,332 and the improved version shown in FIG. 2 of the present application. While the upper conductors do not deflect as much in the more durable overlay shown in FIG. 2, experimental tests have shown that cracking of the upper ITO conductors 38 still occurs with only hand pressure on a stylus. This can better be explained by reference to the graphs of FIGS. 4 and 5.

Figure 4:
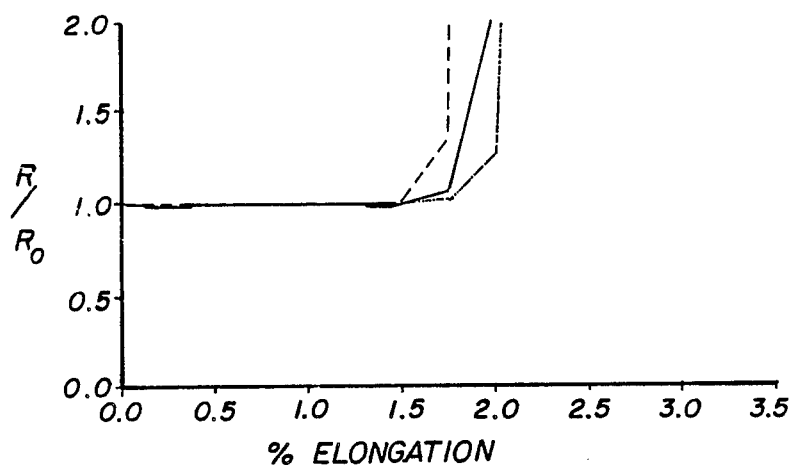
FIG. 4 is a graph illustrating the relationship between conductor elongation due to tension and conductor failure due to cracking.

FIG. 4 illustrates the relationship of ITO conductors subjected to elongation due to tensile forces to the ability of such conductors to transmit electrical signals. The y-axis represents the resistance of the ITO conductors normalized to the value at zero tensile stress (R/Ro). The x-axis represents the percent elongation of the ITO wire conductor. FIG. 4 shows experimental tests conducted on three different samples of ITO wire conductors deposited on 5 mil polyester substrates (shown in solid, dotted and dashed lines). What FIG. 4 shows is that in all three samples, the resistance in the wire conductor remains constant between 0 and about 1.5% elongation, and the touch screen can function without loss of signal. Above about 1.5% elongation, resistance increases abruptly, indicating fracture and loss of signal strength. What is surprising is how little pressure need be exerted by the stylus on the top surface of the upper substrate to place its lower surface, and the ITO wire conductors supported thereon, under sufficient tensile forces to exceed 1.5% elongation. This becomes clearer by reference to FIG. 5.

Figure 5:
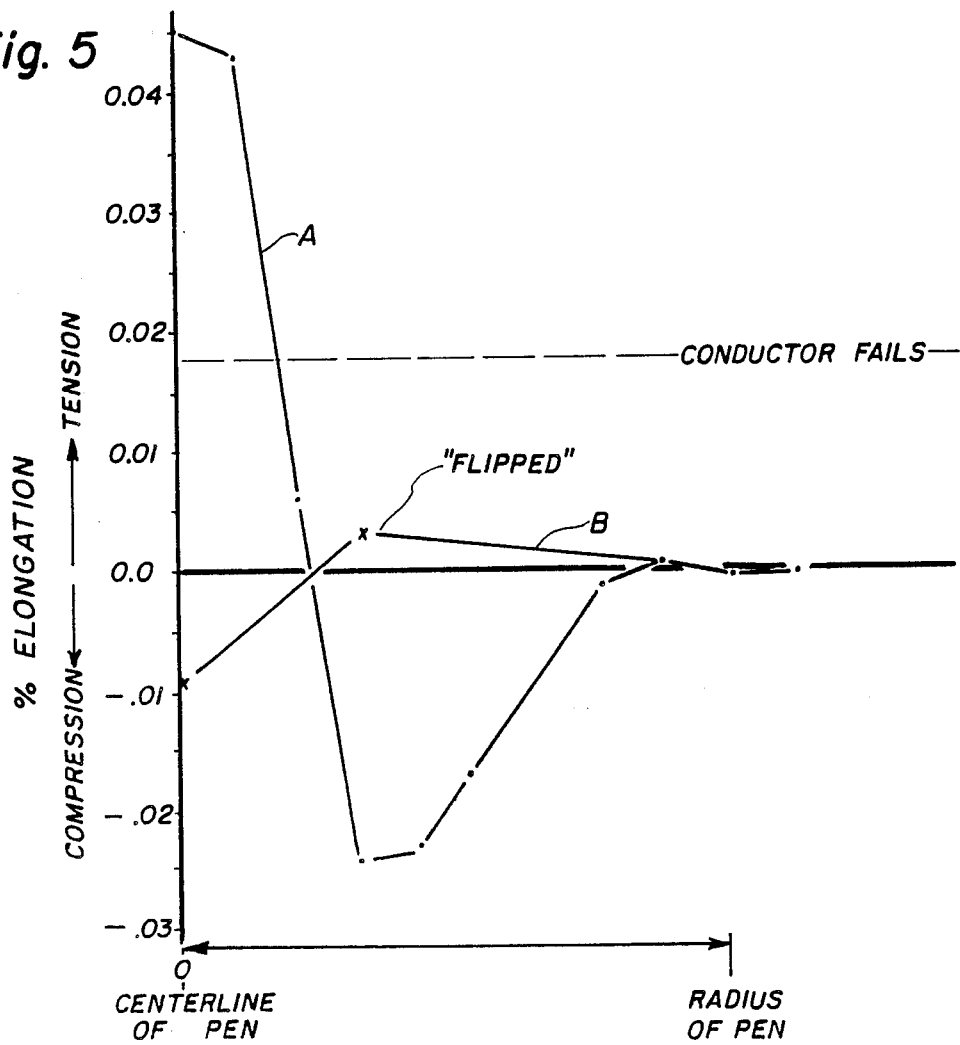
FIG. 5 is a graphic representation of computer modeling of strains in the touch screen overlay of FIG. 2 and comparing the same with the touch screen overlay of FIG. 6.

The graph of FIG. 5 represents a computer modeling of strains in a touch screen using a stylus weighted to approximate hand pressure, which is about 1000 grams. The y-axis represents percent elongation of ITO wire conductors. Above 0, there is positive % elongation due to tension. Below 0, there is negative % elongation due to compression. The x-axis represents distance from the centerline of the stylus point extending out past the radius of the stylus point. The straight horizontal dashed line at approximately 0.0175 or 1.75% elongation is chosen as representing the elongation point at which the ITO conductors have broken and failed. Curve A shows the computer modeling of the touch screen overlay of FIG. 2. It is readily apparent that at or near the stylus centerline, the lower surface of the upper substrate 36 is being subjected to large tensile forces by the stylus, sufficient to cause over 4% elongation in the ITO conductors 38 carried by this surface, or more than twice the % elongation necessary to crack the wire conductors while elongation and tension drop off dramatically away from the area of the stylus centerline. In fact, the computer model shows that the lower surface of the upper substrate 36 and the conductors 38 carried thereon may be subjected to compression at areas away from the stylus centerline. This is consistent with what should be expected away from the centerline where, as shown in FIG. 3, the forces along the lower surface of the upper substrate below the point of stylus deflection go from tension to compression and then back to neutral further away from the deflection point. The damage caused by the high tensile forces at or near the stylus centerline is, however, more than sufficient to cause significant conductor cracking and failure.

The touch screen overlay of the present invention solves these problems by modifying the structure of the overlay 10 of FIG. 2 so that the transparent wire conductors in the upper as well as lower conductor array are subjected principally to compression rather than tension. The lower array of conductors 34, because they are on the upper surface of the lower substrate 32 and face up away from the CRT 12, are in compression where the touch screen is contacted by the stylus. The improved laminate overlay of the present invention, shown generally as 50 in FIG. 6, accomplishes the same for the upper conductor array by essentially "flipping" the layers of the laminate so that the upper array of conductors is on the top surface of the upper substrate and also faces upward.

Figure 6:
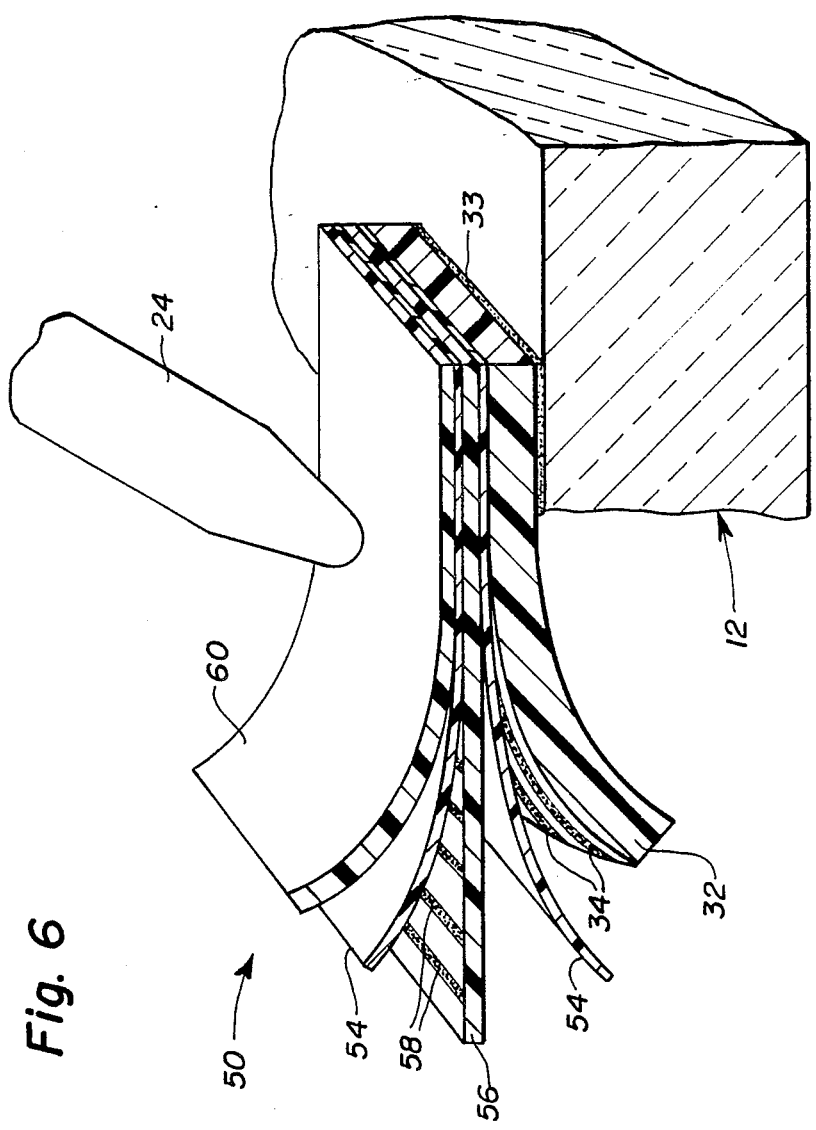
FIG. 6 shows the new laminate structure of the touch screen overlay of the present invention.

FIG. 6 illustrates this flipped overlay laminate structure. The lower substrate 32 and lower array of ITO conductors as well as their attachment to the CRT 12 remains essentially the same as in the overlay of FIG. 2. An anti-newton ring coating and an electrostatic shield layer may likewise be included between the face of the CRT 12 and the lower substrate 32. The upper substrate, now referred to as 56, has been "flipped" so that the upper array of ITO conductors, now referred to as 58, face upward away from the CRT. Upper substrate 56 is otherwise similar to the upper substrate 36 of FIG. 2, formed from sheet of polyester material such as polyethylene terephthalate about 2 mils thick. The ITO conductors 58 are likewise similar to the upper conductors 38 of FIG. 2. The lower substrate 32 and the upper substrate 56 are bonded together by a sheet of polyester based adhesive 54 which is similar to the adhesive sheet 44 of FIG. 2. The adhesive sheet 54 could alternatively be located only at the perimeter of the laminated structure in the non-viewing area, leaving the upper and lower substrates 56,36 touching or separated by air in the viewing area. Adhesive sheet 54 may also be dispensed with entirely if the substrates 56,32 are clamped together at the edge of the overlay by other means such as disclosed in the air gap prior art overlays described earlier. The top surface of the upper substrate 56, which faces the viewer, is covered with a sheet 60 of polyester material similar to substrates 32 and 56 of the overlay laminate. Cover sheet 60 is about 1 mil thick and is laminated to the upper substrate 56 by means of a second sheet of polyester adhesive similar to the one joining the lower and upper substrates 32,56. Both adhesive sheets 54 are about 0.5 mils thick. The top surface of the cover sheet 60 may be coated by an antiglare hardcoat. Cover sheet 60 could alternatively be applied to the upper substrate 56 by other means, such as by spraying, screen printing, vapor deposition or the like, and may be of minimal thickness sufficient to provide scratch protection.

Referring again to FIG. 5, curve B represents a computer model of the flipped structure touch screen overlay of FIG. 6. As is clearly evident, the ITO conductors are in compression at the stylus centerline since the elongation of the upper conductors 58 is a negative 1.0%. This is a far cry from the high tensile forces exerted on the upper conductors 38 of the overlay of FIG. 2. Since ITO and other transparent conducting oxides of brittle ceramic material can withstand a large amount of compression forces, the "flipped" structure of FIG. 6 represents a significant advance touch screen durability.

The flipped overlay laminate structure of FIG. 6 also minimizes lower conductor signal loss due to screening by the upper conductors. The lower conductor signal strength at the surface of the overlay is greatly improved since the upper conductors 58 are further separated from the lower conductors 34 by the thickness of at least substrate 56, thus significantly diminishing the effect of screening by the upper conductors 58. Because the thickness of the overlay, particularly between the lower conductors 34 and the overlay surface, has been reduced, signal strength from both upper and lower sets of conductors has also been improved. Moreover, this new flipped structure is readily adaptable to even greater signal strength enhancement at the overlay surface because the cover sheet 60, which now does not support any transparent conductors, can be reduced to minimal thickness sufficient only for scratch protection. This will further reduce attenuation of the electromagnetic signals emitted by both sets of conductors passing through this layer.

Although specific embodiments of the invention been disclosed, it will be understood by those having skill in the art that changes may be made to these embodiments without departing from the spirit and scope of the invention.

What is claimed is:

1. A touch screen overlay for detection of both finger touch and stylus on the viewing surface of a visual display device comprising:
    a first flexible substrate of transparent insulative material one surface adapted for attachment to the viewing surface of said visual display device;
    a first set of transparent conductors formed in a parallel array on a second surface of said first flexible substrate, said second surface and the conductors thereon facing away from the viewing surface of said visual display device;
    a second flexible substrate of transparent insulative material disposed at one surface thereof adjacent to the second surface of said first flexible substrate;
    a second set of transparent conductors formed in a parallel array on a second surface of said second flexible substrate, said second set of transparent conductors also facing away from the viewing surface of said visual display device and having an orientation perpendicular to the first set of transparent conductors so that both sets form a grid-like pattern when superimposed, separated by at least the thickness of said second flexible substrate which is both thin enough to assure that signal strength of the transparent conductors is sufficient for detection of finger touch and yet thick enough to withstand the forces exerted by the stylus; and
    coating means disposed adjacent to the second surface of said second flexible substrate, said coating means also facing a user and serving as the overlay surface for interactive input by both finger touch and stylus detection means;
    whereby when said coating means is contacted by either finger touch or a stylus detection means, the transparent conductors of both said first and second sets located below the area of contact will be subjected to substantially only compression forces due to any downward deflection on the overlay caused by said contact.

2. The touch screen overlay of claim 1 wherein said coating means is a third flexible substrate of transparent insulative material disposed at one surface thereof adjacent to the second surface of said second flexible substrate, the other surface of said third flexible substrate facing the user and serving as the overlay surface for interactive input, the third flexible substrate layer being thin enough to maintain the touch signal strength from the second layer while the combined thickness of both the second and third flexible substrate layer being thick enough to withstand the forces exerted by the stylus.

3. The touch screen overlay of claim 2 wherein the second flexible substrate is thinner than said first flexible substrate and said first and second flexible substrates are attached to each other by means of a first adhesive sheet of transparent insulative material, the added thickness of said first adhesive sheet being insufficient to affect adversely the touch signal strength.

4. The touch screen overlay of claim 3 wherein said second and third flexible substrates are attached to each other by means of a second adhesive sheet of transparent insulative material, the added thickness of said second adhesive sheet being insufficient to affect adversely the touch signal strength.

5. The touch screen overlay of claim 4 wherein the material of each of said flexible substrates is polyethylene terephthalate, and wherein the thickness of said first flexible substrate layer is on the order of about 5 mils or less, the thickness of said second flexible substrate layer is on the order of about 2 mils or less, the thickness of the third flexible substrate layer is on the order of about 1 mil or less, and the thickness of the first and second layers is on the order of 0.5 mils or less.

6. The touch screen overlay of claim 4 wherein the material of said first and second adhesive sheets is a polyester based, heat curable adhesive which is compatible with the material of said flexible substrates.

7. The touch screen overlay of claim 1 wherein the transparent conductors are ceramic conducting oxides.

8. The touch screen overlay of claim 7 wherein the transparent conductors are composed of indium-tin-oxide.

9. The touch screen overlay of claim 1, further comprising:
a first bus means disposed along a side edge of said first flexible substrate for interconnecting the first set of transparent conductors on said first flexible substrate, and
a second bus means disposed along a side edge of said second flexible substrate for interconnecting the second set of transparent conductors on said second flexible substrate.

10. Interactive input display apparatus comprising the the touch screen overlay of claim 9, and further comprising flexible circuit means for interconnecting the first and second sets of transparent conductors via the first and second bus means, respectively, to a control processor means, said stylus detection means also be connected to said control processor means whereby the position of the stylus detection means at the viewing surface of the visual display surface is displayed by correlating electromagnetic radiation emitted by the transparent conductors with signals detected by the stylus detection means.

11. The interactive input display apparatus of claim 10 wherein the position of a finger touch is detected by a change in capacitance detected by the transparent conductors of said first and second sets in the area below said finger touch, signals representing said capacitance change being transmitted via said conductors, bus means, and flexible circuit means to said processor control means.

12. The touch screen overlay of claim 2 wherein the other surface of the third flexible substrate is coated with an antiglare means.

13. The touch screen overlay of claim 1 wherein the first and second sets of conductors are spaced sufficiently apart to minimize the loss of signal at the overlay surface from the first set of conductors due to screening by the second set of conductors.

14. The touch screen overlay of claim 1 wherein the thickness of the overlay between the first set of conductors and the overlay surface is sufficiently minimized to enhance signal strengths from both the first and second set of conductors at the overlay surface.

* * * * *